(No Model.)

G. W. FAIRMAN.
CAR WHEEL AND AXLE.

No. 267,508. Patented Nov. 14, 1882.

Witnesses
Alexander Lowry
Douglas Gibson

Inventor
Gibson W. Fairman
by his Attorney
M. Randolph

UNITED STATES PATENT OFFICE.

GIBSON W. FAIRMAN, OF NEW YORK, N. Y., ASSIGNOR, BY DIRECT AND MESNE ASSIGNMENTS, TO THE FAIRMAN WHEEL AND AXLE COMPANY, OF NEW YORK.

CAR WHEEL AND AXLE.

SPECIFICATION forming part of Letters Patent No. 267,508, dated November 14, 1882.

Application filed September 9, 1882. (No model.)

*To all whom it may concern:*

Be it known that I, GIBSON W. FAIRMAN, of New York, in the county of New York and State of New York, have invented a new and useful Improvement in Independent Car-Wheels and Journal-Bearings; and I hereby declare the following to be a full and clear description of the same.

This invention has for its object the construction of car-wheels and their axles in such manner that the wheels may rotate around the axle, so as to allow either wheel to turn independently of the other, thus obviating the sliding friction on the rails that is now incidental to railway traffic, where the wheels are fixed to the axle, as they commonly are, thus compelling one wheel or the other to slide on the track while rounding curves, thereby greatly increasing the expenditure of locomotive power, and at the same time causing unnecessary wear and abrasion both to the periphery of the wheels and to the tread of the rails, and also greatly increasing the liability to breakage of the axles by torsion.

Figure 1:
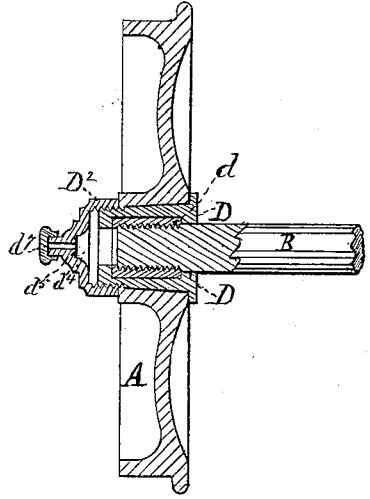
Figure 2:
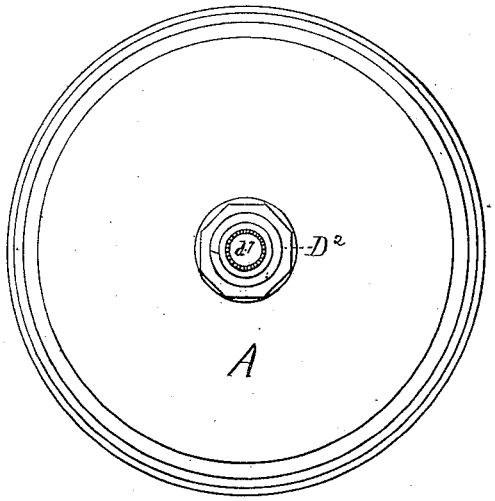
Figure 3:
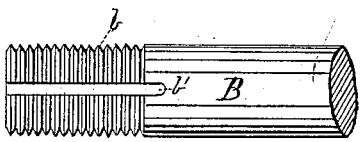
Figure 4:
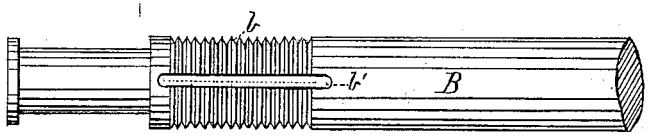
Figure 5:
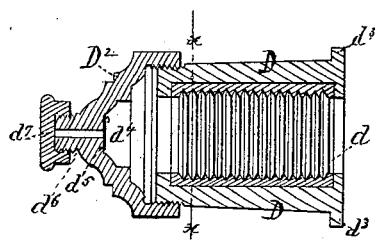
Figure 6:
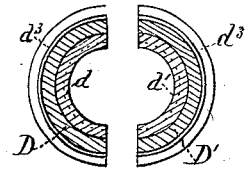

The invention will be readily understood by reference to the accompanying drawings, of which Figure 1 is a sectional elevation of one of the improved bearings as applied to a railway-car wheel and axle. Fig. 2 is a side elevation of a car-wheel fitted with the improved bearings. Figs. 3 and 4 are detailed elevations of one end of a car-axle provided with the improved bearings. Figs. 5 and 6 are detailed views of the bushings which form parts of these improved bearings.

The wheels A and the axles B are similar to those in common use on railways, except as to the devices for assembling these two parts together, and forming the journal-bearings. These improvements consist in the improved construction of both the wheel and the axle, as hereinafter more fully explained, and in the bushings D D', interposed between the axle and the wheel and forming a part of the bearing. The bushing is made in two parts, D and D', each part of which is semi-cylindrical in formation, as shown in detail, Fig. 6, which represents the two parts or sections of the said bushing separated slightly from each other, so as to show clearly the two-part construction. The said Fig. 6 shows the bushing-pieces in section, the section being taken on the dotted line $x\ x$ of Fig. 5, thereby showing clearly the lining $d\ d'$, which forms the wearing-surface of the said bushing. These lining-pieces $d\ d'$, I form of Babbitt metal or any suitable journal-bearing material, and fit or form them in recesses properly prepared in the bushing-pieces to receive them.

The periphery of the bearing surface of the journal of the car-axle B is surrounded by a continued series of annular grooves and ridges or bands, $b$, preferably of V-shaped formation or section, as is clearly shown in the drawings. These grooves and ridges, alternating, as they do, like the threads of a screw, except that each groove and ridge is perfect and complete in itself, and is formed perpendicularly to the axis of the axle, constitute the entire bearing-surface of the journal, and take up all the longitudinal thrusts, and prevent any lateral motion of the axle in the bushing.

A longitudinal groove, $b'$, cut in the periphery of the journal-bearing, as shown in Figs. 3 and 4, admits a lubricant to the whole length of the journal-bearing, right through or between the grooves and ridges of the bearing. This groove should be cut a little deeper than the bottoms of the grooves of the journal, so as to secure a clear lubricating-channel.

The cavity in the end of the bushing covered by the cap-piece $D^2$ constitutes a magazine or receptacle for the lubricant. There may be an annular chamber (not shown) at the other end of the journal, to also serve as a magazine for the lubricant. These arrangements for introducing the lubricant to the bearing, however, are mere matters of detail, which will readily suggest themselves to any expert mechanic. The nut or cap-piece $D^2$ is secured onto the outer end of the bushing, and not only serves to cover completely from the dust the journal-bearing, but also acts as a stop and guard against the outside of the car-wheel against which it is screwed.

The exterior surface of the bushing D D' is slightly conical or tapering in form, as is clearly shown in Figs. 1 and 5. The larger end of the bushing is at the rear or inner end and terminates against the annular flange $d^3$, which forms a stop and guide for the inner side of the wheel to rest against. The hub of the wheel is bored out so as to allow the bushing D D' to fit tightly within it when the said bushing is forced home into the wheel, so that the flange $d^3$ rests against the inside of the wheel.

The nut $D^2$, then being screwed into place, holds the bushing and the wheel firmly together and allows the wheel and its bushing to turn on the axle, thus permitting each wheel of a pair of wheels to turn independently of the other wheel, and thereby causing the entire elimination of sliding friction on the rails.

For new work I prefer the form of axle shown in Figs. 1 and 3; but to adapt these improvements to car axles and wheels now in use I employ the form of construction shown in Fig. 4, in which the old journal-bearing is shown outside of the wheel, so that it may be carried in and support the old form of pedestal; but where the work is all new the pedestal (not shown) is to be inside of the wheels. In neither case is the axle required to rotate, the wheel rotating about the axle.

The nut or cap $D^2$ contains and partly forms the magazine $d^4$, above alluded to, and this oil or lubricating magazine is to be filled through an aperture extending through the metal of the nut, the said aperture being guarded or stopped by an inwardly-opening check-valve, $d^5$, which permits the lubricant flowing into the said magazine, but prevents its outflow. This inlet-aperture for the lubricating-magazine is formed through an outwardly-projecting nipple, $d^6$, which is capped exteriorly by the cap-piece $d^7$, which is screwed on by a simple thumb-and-finger movement, so that the said cap-piece $d^7$ may easily be unscrewed to allow filling the oil-magazine from an oil-can, or screwed on again after the said oil-magazine shall have been filled. An ordinary spring-bottom oil-can can be used to inject the oil into the magazine and open the valve $d^5$ in doing so.

Having described my invention, I claim—

1. A car-wheel bearing formed of tapering semi-annular bushing-pieces fitted tightly into the hub of the wheel, and having their concave journal-bearing surfaces grooved to fit corresponding V-shaped circumferential grooves and ridges on the periphery of the axle-journal, substantially as and for the purpose set forth.

2. In combination with a suitably-apertured wheel and grooved axle, the herein-described semi-annular tapering bushing and journal-bearing, provided with internal V-shaped grooves and ridges, and formed with a flange at its widest or inner end and suitable screw-thread at its outer end, a nut or cap internally recessed to form an oil-magazine, and having suitable capped oil-inlet and a retaining-valve and adapted to be applied to said outer end, substantially as described.

3. In combination with a suitably-apertured wheel and grooved axle, the herein-described semi-annular tapering bushing and journal-bearing, provided with internal bevel-edged or sloping grooves and ridges, and formed with a flange at its widest or inner end and suitable screw-thread at its outer end, and a nut or cap adapted to be screwed thereon, substantially as set forth.

4. The lubricating-magazine $d^4$ in the outside securing-nut, $D^2$, provided with an inwardly-opening check-valve, $d^5$, in combination with the journal-bearing B D D', substantially as described.

GIBSON W. FAIRMAN.

Witnesses:
 M. RANDOLPH,
 ALEXANDER LOWRY.